(12) United States Patent
Iwamoto et al.

(10) Patent No.: US 9,477,120 B2
(45) Date of Patent: Oct. 25, 2016

(54) LIQUID CRYSTAL DISPLAY DEVICE

(71) Applicant: STANLEY ELECTRIC CO., LTD., Meguro-ku, Tokyo (JP)

(72) Inventors: Yoshihisa Iwamoto, Tokyo (JP); Hiroshi Tozuka, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 139 days.

(21) Appl. No.: 14/577,995

(22) Filed: Dec. 19, 2014

(65) Prior Publication Data

US 2015/0177577 A1 Jun. 25, 2015

(30) Foreign Application Priority Data

Dec. 20, 2013 (JP) ................................. 2013-263864

(51) Int. Cl.
*G02F 1/1343* (2006.01)
*G02F 1/1345* (2006.01)

(52) U.S. Cl.
CPC ....... *G02F 1/134327* (2013.01); *G02F 1/1345* (2013.01); *G02F 1/134363* (2013.01)

(58) Field of Classification Search
CPC ........... G02F 1/134327; G02F 1/1345; G02F 1/134363
See application file for complete search history.

(56) References Cited

U.S. PATENT DOCUMENTS

| 4,281,901 A * | 8/1981 | Ushiyama ......... G02F 1/134327 349/139 |
| 4,345,249 A | 8/1982 | Togashi |
| 4,547,773 A * | 10/1985 | Clark ................ G02F 1/134327 345/204 |
| 2013/0070191 A1* | 3/2013 | Hirosawa .............. G02F 1/1337 349/123 |

FOREIGN PATENT DOCUMENTS

| JP | 5691277 A | 7/1981 |
| JP | 07072491 A | 3/1995 |

* cited by examiner

*Primary Examiner* — Anne Hines
(74) *Attorney, Agent, or Firm* — Holtz, Holtz & Volek PC (57) ABSTRACT

To provide an IPS mode liquid crystal display device suitable for a segment display type that is easy to dispose each electrode and lead wirings on the same surface. The liquid crystal display device comprises first lead wirings each connected to one of the first electrodes, second lead wirings each connected to one of the second electrodes, a terminal part exposed on one edge of the first substrate without overlapping the second substrate, first external extraction electrode terminals, a detour wiring provided to the terminal part that connects several second lead wirings of the plurality of second lead wirings to each other, with each of first external extraction electrode terminals electrically insulated, second external extraction electrode terminals where each is connected to the second lead wirings connected to the detour wirings or the second lead wirings not connected to the detour wirings of the second lead wirings.

8 Claims, 11 Drawing Sheets

LIQUID CRYSTAL DISPLAY DEVICE

BACKGROUND OF THE INVENTION

1. Field of the Invention

The present invention relates to a liquid crystal display device that drives a liquid crystal layer on a substrate surface using a horizontal electric field.

2. Description of the Background Art

In a general liquid crystal display device, electrodes are respectively provided to each of a pair of substrates that are disposed facing each other and which sandwich a liquid crystal layer, and a display at bright and dark state is achieved by inducing an electric field in a direction perpendicular to the substrate surface using these electrodes, thereby re-orientation in the liquid crystal layer is achieved. In such a liquid crystal display device, the liquid crystal molecules in the liquid crystal layer are oriented at an incline with respect to the substrate surface when an electric field is applied, causing the inclined direction to be biased in one direction and, in turn, viewing angle dependency to occur in the display at bright and dark state.

In order to eliminate such a disadvantage, liquid crystal display devices capable of achieving favorable viewing angle characteristics have been disclosed in Japanese Unexamined Patent Application Publication No. 56-91277 (hereinafter referred to as "Patent Document 1") and Japanese Unexamined Patent Application Publication No. 07-72491 (hereinafter referred to as "Patent Document 2"), for example. The liquid crystal display devices disclosed in Patent Document 1 and Patent Document 2 provide a display electrode and a common electrode on a surface of one of a pair of substrates, respectively, that are disposed facing each other and which sandwich a liquid crystal layer, and achieve a display at bright and dark state by producing an electric field in the substantial horizontal direction on the substrate surface using the area between both electrodes, thereby re-orientation in the liquid crystal layer is achieved. With such a liquid crystal display device, viewing angle dependency is not likely to occur in the display at bright and dark state since the liquid crystal molecules in the liquid crystal layer re-orient on the substrate surface while remaining in a horizontal state when an electric field is applied, making it possible to achieve favorable viewing angle characteristics. Such a liquid crystal display device is called an in-plane switching (IPS) mode liquid crystal display device. The liquid crystal display device disclosed in Patent Document 1 is an active matrix type wherein active elements such as thin film transistors and the like are provided to each crossing part of a display electrode and a common electrode to switch each pixel. On the other hand, the liquid crystal display device disclosed in Patent Document 2 is a simple matrix type that does not use active elements such as described above.

However, while both IPS mode liquid crystal display devices of the preceding examples assume that a plurality of pixels is disposed in a matrix pattern to display an image, they do not propose a structure suitable for a segment display-type liquid crystal display device comprising an arbitrary display part shape. Specifically, in the IPS mode liquid crystal display devices of the preceding examples, a crossing section always exists in the planar view of the display electrodes and counter electrodes or the lead wirings connected thereto, and the insulation of this crossing section is secured by interposing an insulating film. The provision of such an insulating film causes an increase in the number of processes at the time of liquid crystal display device manufacture.

Hence, according to the liquid crystal display device disclosed in Patent Document 1, the insulating film of the crossing section described above can be formed in conjunction with the formation of a passivation film that is provided to construct the active elements, making insulating film formation less likely to cause an increase in the number of manufacturing processes. Nevertheless, active elements are generally not provided in the segment display-type liquid crystal display device, resulting in concern that the number of manufacturing processes will increase in a case where the decision is made to provide an insulating film at a crossing section such as described above. On the other hand, while to ensure that a crossing section is not provided requires that all lead wirings respectively corresponding to the display electrode and counter electrode be disposed on the same surface, the amount of lead wirings increases with an increase in the number of display parts, making it difficult to dispose each electrode and lead wiring on the same surface without providing a crossing section.

It is therefore an object of the specific aspects according to the present invention to provide an IPS mode liquid crystal display device in which it is easy to dispose each electrode and lead wiring on the same surface, and which is suitable for a segment display type.

SUMMARY OF THE INVENTION

The liquid crystal display device according to an aspect of the present invention is a liquid crystal display device comprising a display part for displaying standard characters or designs, further comprising (a) a first substrate and a second substrate that are disposed facing each other, (b) a liquid crystal layer disposed between the first substrate and the second substrate, (c) a plurality of first electrodes provided to one surface side of the first substrate, (d) a plurality of second electrodes provided to one surface side of the first substrate, (e) a plurality of first lead wirings provided to one surface side of the first substrate, each connected to one of the plurality of first electrodes, (f) a plurality of second lead wirings provided to one surface side of the first substrate, each connected to one of the plurality of second electrodes, (g) a terminal part exposed at one edge of the first substrate without overlapping the second substrate, (h) a plurality of first external extraction electrode terminals, each connected to any one of the plurality of first lead wirings, provided to the terminal part, (i) a detour wiring that connects several second lead wirings of the plurality of second lead wirings to each other, with each of the plurality of first external extraction electrode terminals electrically insulated, provided to the terminal part, and (j) a plurality of second external extraction electrode terminals, each connected to the second lead wirings connected to the detour wirings or the second lead wirings not connected to the detour wirings of the plurality of second lead wirings, provided to the terminal part.

According to the foregoing configuration, several of the second lead wirings are connected to each other via the detour wiring and then connected to the second external extraction electrode terminals by utilizing the terminal part, thereby making it possible to increase the freedom of the wiring layout on the substrate. With this arrangement, it is easy to dispose each electrode and lead wiring on the same surface without providing a crossing section, making it possible to achieve a multiplex-driven IPS mode liquid crystal display device suitable for a segment display type.

Preferably, in the foregoing liquid crystal display device, the detour wiring includes one or more connection wirings and a jumper wiring, wherein the connection wirings are disposed in gaps between the plurality of first external extraction electrode terminals in the planar view, and the jumper wiring is disposed on the side closer to an edge of the first substrate than each of the plurality of first external extraction electrode terminals in the planar view.

Preferably, in the foregoing liquid crystal display device, the detour wirings include one or more pad parts and a conduction material, and an insulating film is provided to the terminal part comprising one or more openings that expose at least a part of the pad part, wherein the pad part is disposed in a gap between the plurality of first external extraction electrode terminals in the planar view, and the conduction material is provided to an upper side of the insulating film, contacting the pad part. The conduction material here is, for example, a conductive paste.

Preferably, in the foregoing liquid crystal display device, the plurality of first electrodes and the plurality of second electrodes each comprise a plurality of electrode branches, each of the plurality of first electrodes forms a pair with any one of the plurality of second electrodes, and the first electrode and the second electrode that form the pair are disposed so that the plurality of electrode branches of each is alternately arranged.

BRIEF DESCRIPTION OF THE DRAWINGS

FIG. 8 is a plan view showing a disposition example of the insulating film provided to the upper side of the jumper wiring and the like.

FIG. 13 is a plan view showing a disposition example of the insulating film provided to the upper side of the pad part and the like.

FIG. 20 is a plan view showing a disposition example of the insulating film provided to the upper side of the jumper wiring and pad parts and the like.

DESCRIPTION OF THE PREFERRED EMBODIMENTS

The following describes embodiments of the present invention with reference to drawings.

Embodiment 1

Figure 1:
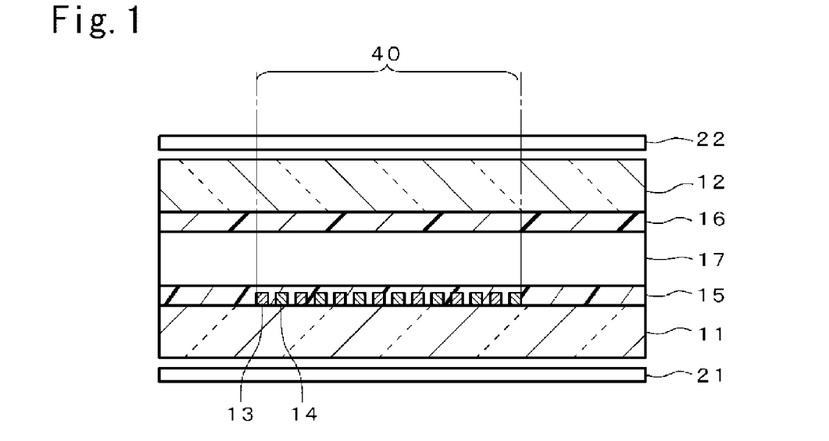
FIG. 1 is a cross-sectional view showing the configuration of the liquid crystal display device of embodiment 1.
Figure 2:
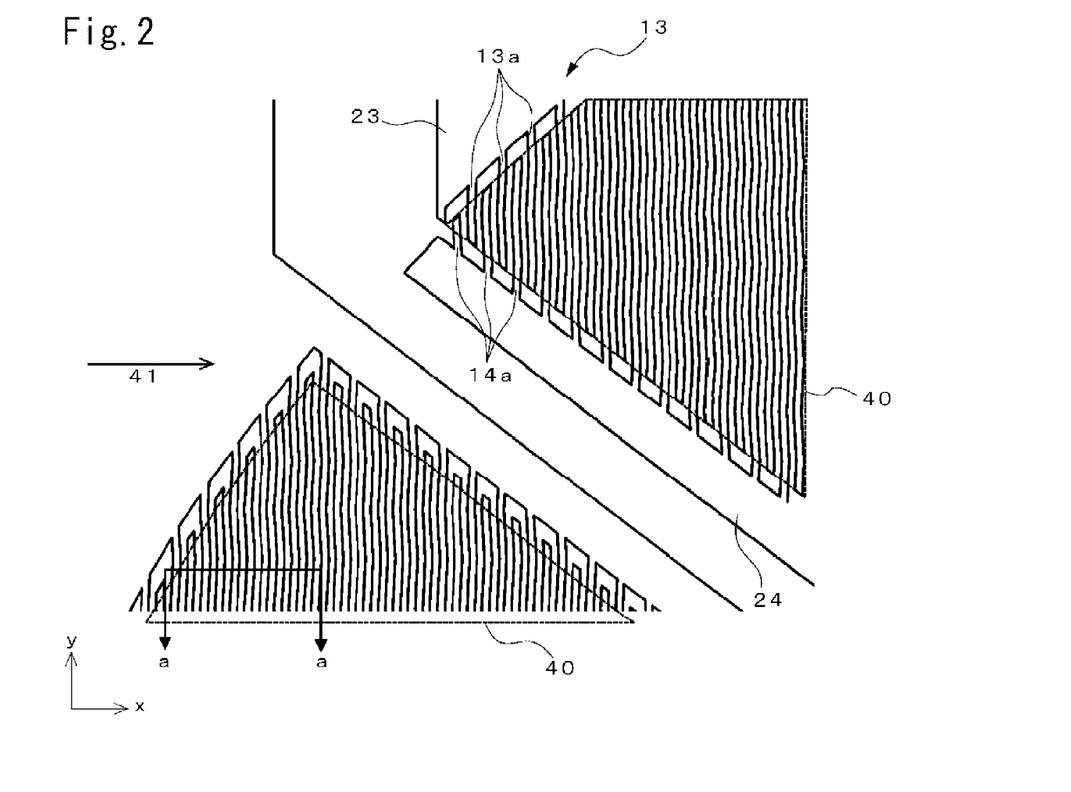
FIG. 2 is a plan view showing a configuration example of the electrodes and lead wirings of the liquid crystal display device of embodiment 1.

FIG. 1 is a cross-sectional view showing the configuration of the liquid crystal display device of embodiment 1. And FIG. 2 is a plan view showing a configuration example of the electrodes and lead wirings of the liquid crystal display device of embodiment 1. The cross-sectional view of FIG. 1 corresponds to the cross-section along a-a shown in FIG. 2. As shown in each figure, the liquid crystal display device of this embodiment comprises a first substrate 11 and a second substrate 12 disposed facing each other, and a liquid crystal layer 17 disposed between the first substrate 11 and the second substrate 12 as a basic configuration. For example, the liquid crystal display device of this embodiment is configured so that the area where the electrodes are disposed directly forms the characters and designs, and the device is basically capable of displaying only predetermined characters and the like, that is, only standard characters and the like, and is a segment display-type liquid crystal display wherein generally an area of about 50% or less in terms of the area ratio inside the effective display area contributes to the display of characters and the like. Note that the liquid crystal display device may be a mixture of a dot matrix display type and segment display type wherein a plurality of pixels are arranged in a matrix pattern.

The first substrate 11 and the second substrate 12 are each a transparent substrate, such as a glass substrate, plastic substrate, or the like, for example. As shown, the first substrate 11 and the second substrate 12 are bonded together with a predetermined gap (approximately 3 μm, for example) therebetween. The gap between the first substrate 11 and the second substrate 12 is maintained by rod-shaped or spherical spacers contained in a frame-shaped sealing material (not shown) and spherical spacers uniformly distributed and disposed inside the substrate surface.

A first electrode 13, a second electrode 14, a lead wiring (first lead wiring) 23, and a lead wiring (second lead wiring)

24 are each provided to one surface side of the first substrate 11. The first electrode 13 is connected to the lead wiring 23, and the second electrode 14 is connected to the lead wiring 24. The first electrode 13, the second electrode 14, and the lead wirings 23 and 24 are each configured by suitably patterning a transparent conductive film, such as indium-tin oxide (ITO), for example.

Figure 3A:
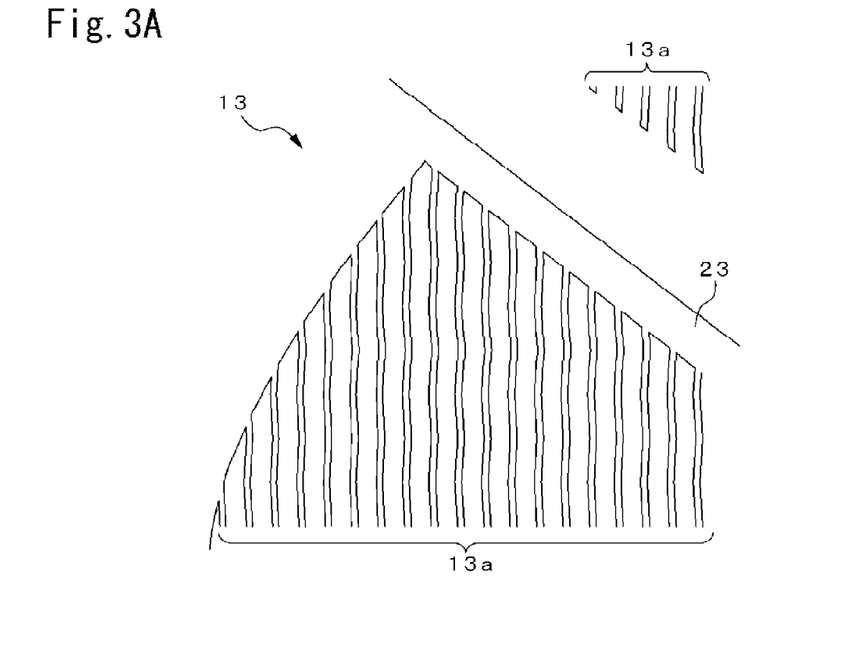
FIG. 3A is a plan view showing the first electrode.
Figure 3B:
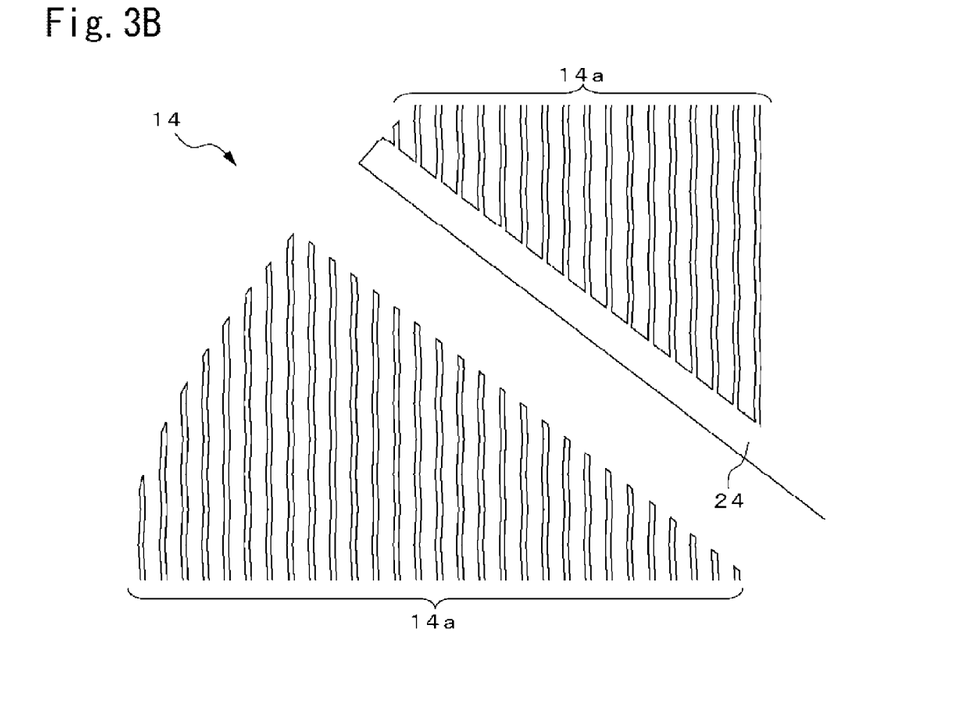
FIG. 3B is a plan view showing the second electrode.

The first electrode 13 is a comb-tooth shaped electrode consisting of a plurality of electrode branches 13a. Similarly, the second electrode 14 is a comb-tooth shaped electrode consisting of a plurality of electrode branches 14a. As shown in FIG. 2, in the planar view of the electrodes, the first electrode 13 and the second electrode 14 are disposed so that the electrode branches of one alternately mesh with the electrode branches of the other. FIG. 3A is a plan view showing the first electrode 13, and FIG. 3B is a plan view showing the second electrode 14. As shown in FIG. 1 and FIG. 2 respectively, an area where the electrode branches of both electrodes are disposed is the display part 40 that contributes to the display of characters and the like. In the display part 40, each of the electrode branches 13a and 14a of the first electrode 13 and the second electrode 14 is alternately disposed at regular intervals.

A first alignment film 15 is provided so as to cover the first electrode 13, the second electrode 14, and each of the lead wirings 23 and 24 on one surface side of the first substrate 11. A second alignment film 16 is provided to one surface side of the second substrate 12. A planer alignment film that restricts the orientation of the liquid crystal layer 17 to a planer alignment is used as the first alignment film 15 and the second alignment film 16. A uniaxial alignment process such as a rubbing process is performed on each alignment film.

The liquid crystal layer 17 is provided between the first substrate 11 and the second substrate 12. In this embodiment, the liquid crystal layer 17 is configured using a liquid crystal material with a negative dielectric anisotropy $\Delta\in$. The liquid crystal layer 17 of this embodiment is set in a planer alignment in which the direction of orientation of the liquid crystal molecules when a voltage is not applied is substantially parallel with respect to each substrate surface of the first substrate 11 and the second substrate 12.

In a case where a liquid crystal material comprising a negative dielectric anisotropy is used for the liquid crystal layer 17, a direction of orientation 41 of the liquid crystal molecules at the substantial center in the layer thickness direction of the liquid crystal layer 17 can be set to the direction x, which is the direction crossing the extending direction of each of the electrode branches 13a and 14a, as shown, for example. Note that, in a case where a liquid crystal material comprising a positive dielectric constant anisotropy is used, the direction of orientation 41 can be set to the direction y, which is the direction parallel to the extending direction of each of the electrode branches 13a and 14a, for example. With this arrangement, it is possible to reverse with respect to one another the in-plane rotation direction of the liquid crystal molecules when voltage is applied in each area where the bending direction on each edges of the respective electrode branches 13a and 14a differs, thereby making it possible to achieve a two-domain orientation and thus improve viewing angle characteristics.

A first polarizer 21 is disposed on the outside of the first substrate 11. Similarly, a second polarizer 22 is disposed on the outside of the second substrate 12. The first polarizer 21 is disposed so that an absorption axis thereof is substantially parallel to the direction of orientation of the liquid crystal molecules of the liquid crystal layer 17, for example. Further, the second polarizer 22 is disposed so that an absorption axis thereof crosses the absorption axis of the first polarizer 21. (For example, the second polarizer 22 is disposed so that an absorption axis thereof is substantially perpendicular to the absorption axis of the first polarizer 21.) Note that an optical compensator, such as a C plate, may be suitably disposed between each polarizer and each substrate.

Figure 4:
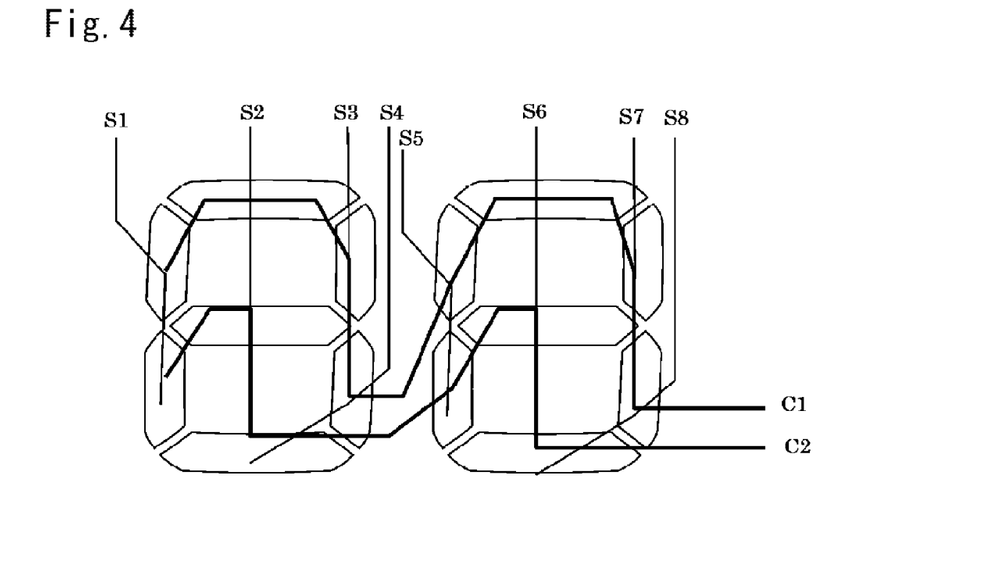
FIG. 4 is a diagram for explaining the connected state of the liquid crystal display device of embodiment 1.

FIG. 4 is a diagram for explaining the connected state of the liquid crystal display device of embodiment 1. Here, the connected state of a segment display-type liquid crystal display device capable of displaying a two-digit number is shown. The number of each digit is respectively expressed using seven display parts (segment display parts), with 14 display parts existing in total. According to this embodiment, a case where each display part of such a segment display type is multiplex driven under ½ duty is considered. Eight wirings S1-S8 indicated by a solid line show the connected state of each first electrode (segment electrode), and two wirings C1 and C2 indicated by a solid line show the connected state of each second electrode (scanning electrode).

Figure 5:
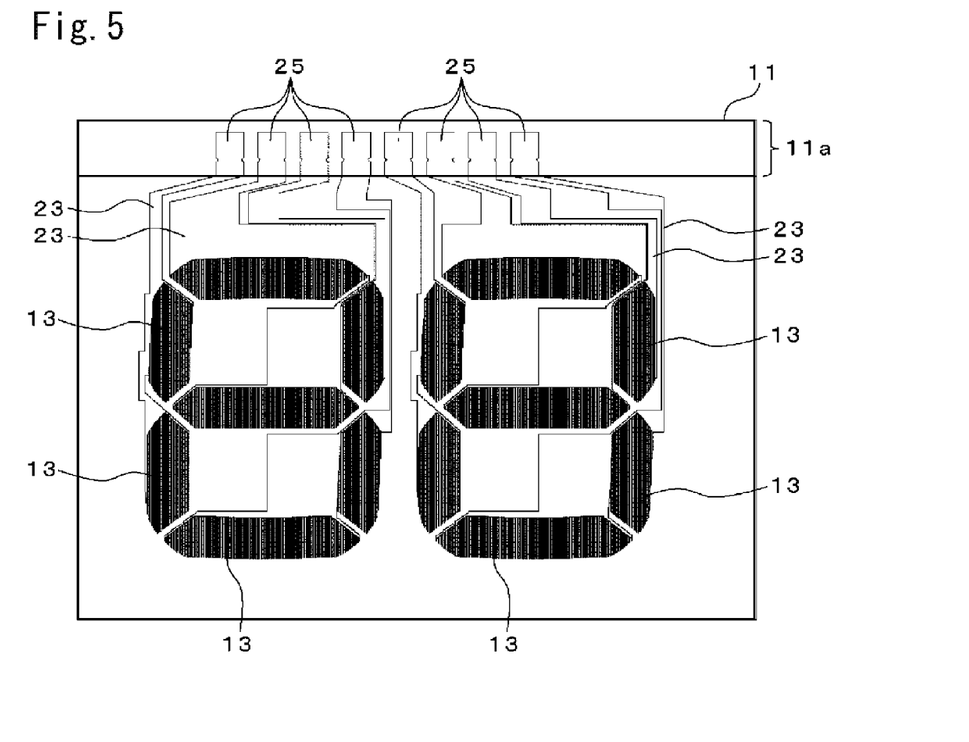
FIG. 5 is a plan view showing a configuration example of the first electrode (segment electrode) and lead wirings of the liquid crystal display device of embodiment 1.

FIG. 5 is a plan view showing a configuration example of the first electrode (segment electrode) and lead wirings of the liquid crystal display device of embodiment 1. As shown in FIG. 5, each of the first electrodes 13 is respectively and correspondingly provided to a total of 14 display parts for displaying the two-digit number. As shown in FIG. 3A, each of the first electrodes 13 are made of comb-tooth shaped electrodes 13a. A reference numeral is provided only for a few representative first electrodes 13. The lead wiring 23 is connected to each of the first electrodes 13 in order to achieve the connected state shown in FIG. 4. A reference numeral is provided only for a few representative lead wirings 23. External extraction electrode terminals 25 are provided to a terminal part 11a on the upper edge side of the first substrate 11 for connection to an external drive circuit (not shown), and are respectively connected to the lead wirings 23. Note that the terminal part 11a is a section where a part of the first substrate 11 is exposed without overlapping the second substrate 12, and where the external extraction electrode terminals 25 (and external extraction electrode terminals 26 described later) are provided.

Figure 6:
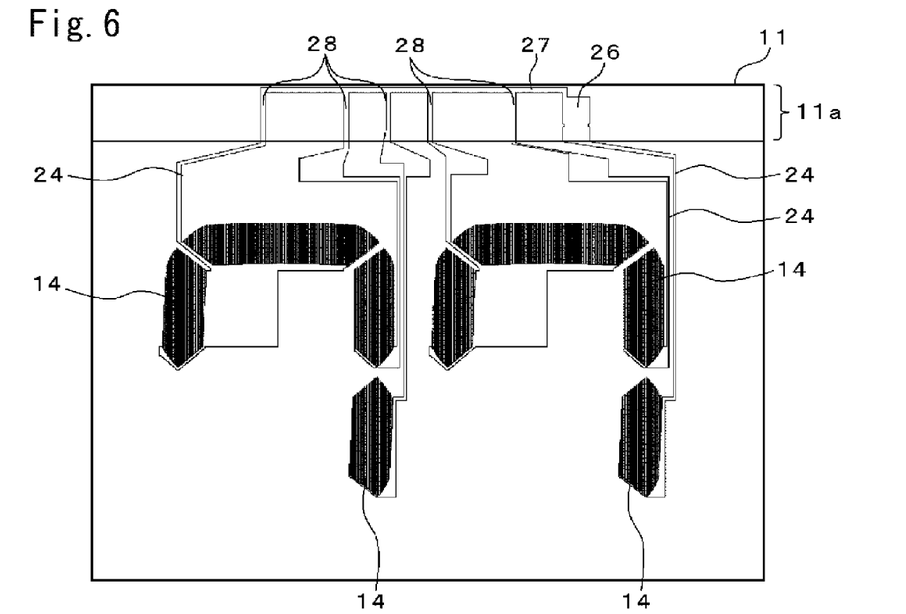
FIG. 6 is a plan view showing a configuration example of the second electrode (common electrode) and lead wirings of the liquid crystal display device of embodiment 1.
Figure 7:
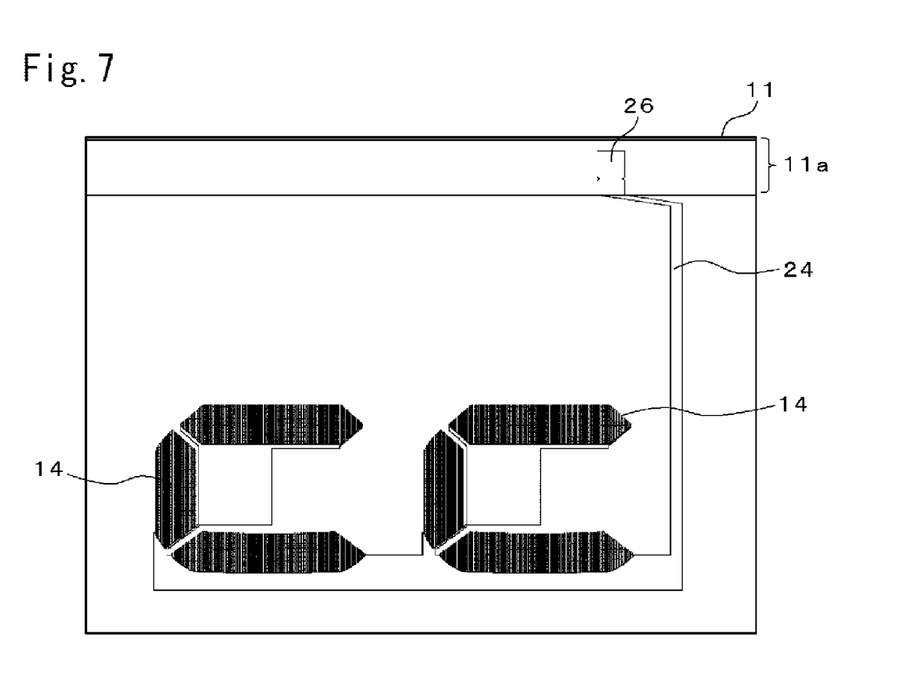
FIG. 7 is a plan view showing a configuration example of the second electrode (common electrode) and lead wirings of the liquid crystal display device of embodiment 1.

FIG. 6 and FIG. 7 are plan views showing a configuration example of the second electrode (common electrode) and lead wirings of the liquid crystal display device of embodiment 1. Each of the second electrodes 14 is respectively and correspondingly provided to a total of 14 display parts for displaying the two-digit number. FIG. 6 shows a portion of each of the second electrodes 14 corresponding to the above described wiring C1 and FIG. 7 shows a portion of each of the second electrodes 14 corresponding to the above described wiring C2. As shown in FIG. 3B, each of the second electrodes 14 are made of comb-tooth shaped electrodes 14a. A reference numeral is provided only for a few representative second electrodes 14. The lead wiring 24 is connected to each of second electrodes 14. A reference numeral is provided only for a few representative lead wirings 24.

As shown in FIG. 6, a detour wiring for connecting each of the lead wirings 24 to one another is provided to the terminal part 11a on the upper edge side of the first substrate 11. Specifically, the detour wiring is made of a jumper wiring 27 and each of the connection wirings 28. In the example shown, the jumper wiring 27 is provided linearly along an upper edge of the first substrate 11, and is disposed on the side closer to the upper edge of the first substrate 11 than each of the above described external extraction electrode terminals 25 on the terminal part 11a. Then, the end parts of each of the lead wirings 24 and the jumper wiring 27 are respectively connected by the connection wirings 28. Each of the connection wirings 28 is disposed on the terminal part 11a, in the gaps between the above described external extraction electrode terminals 25 so as to not contact the external extraction electrode terminals 25 (refer to FIG. 9 described later). The respective lead wirings 24 are all connected to one external extraction terminal 26 by a detour wiring made of the jumper wiring 27 and each of the connection wirings 28. The external extraction electrode terminal 26 is for connection to the external drive circuit (not shown). Note that the lead wiring 24 shown in FIG. 7 is directly connected to the external extraction electrode terminal 26.

Figure 8:
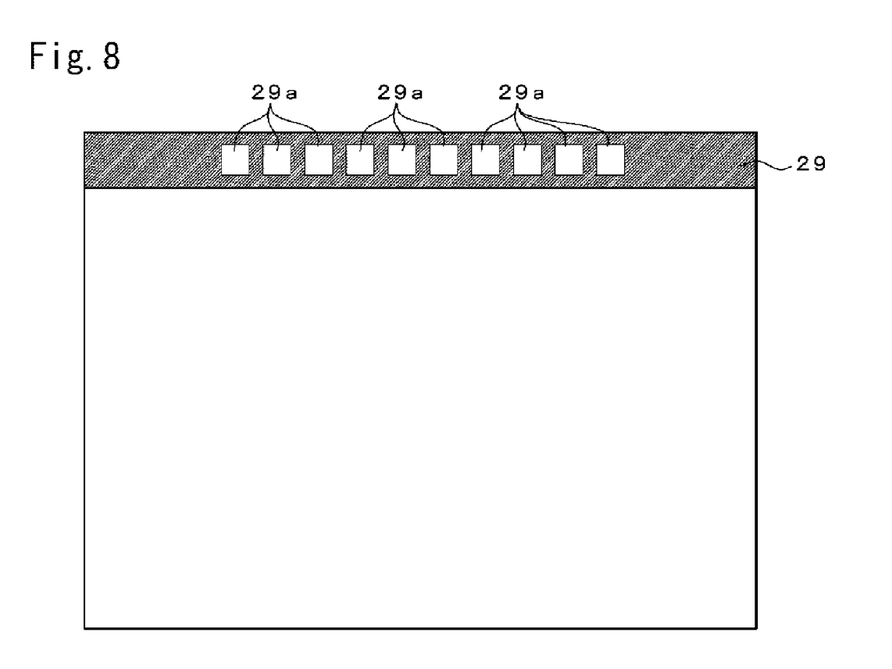

FIG. 8 is a plan view showing a disposition example of the insulating film provided to the upper side of the jumper wiring and the like. Each of the external extraction electrode terminals 25 and 26 is disposed on the same surface of the terminal part 11a on the upper edge side of the first substrate 11, and a lead frame and the like (not shown) are provided to each of the external extraction electrode terminals 25 and the like, making it necessary to prevent short circuiting between the jumper wiring 27 and the like and the external extraction electrode terminals 25. For this reason, as shown, an insulating film 29 comprising a plurality of openings 29a, each exposing an area where each of the external extraction electrode terminals 25 and 26 is formed, is provided to the terminal part 11a of the first substrate 11. The insulating film 29 here is, for example, an SiO$_2$ film or the like. By providing such the insulating film 29 to cover the jumper wiring 27 and the like, it is possible to reliably prevent short circuiting between the jumper wiring 27 and the like and the external extraction electrode terminals 25.

Figure 9:
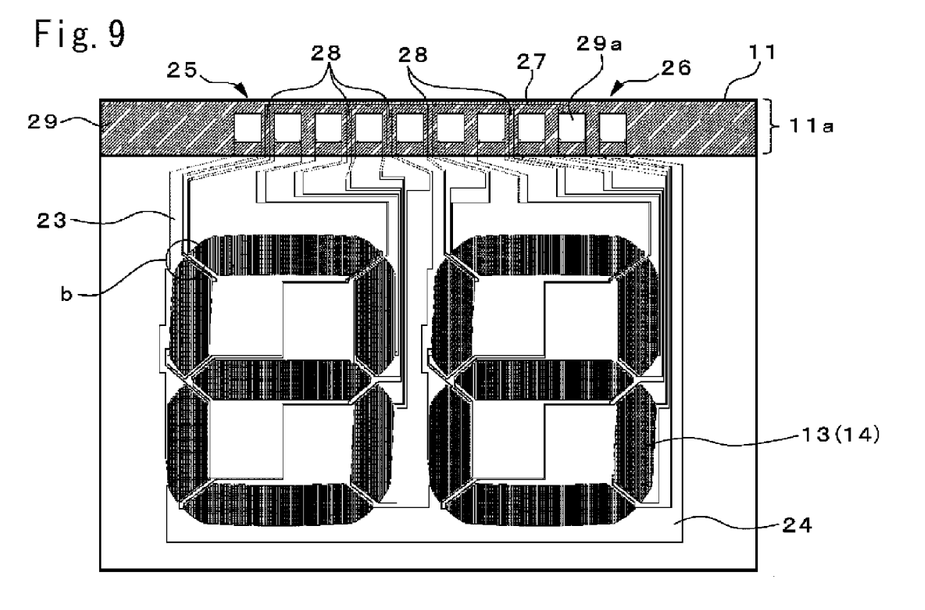
FIG. 9 is a plan view showing the first electrode and second electrode of the liquid crystal display device of embodiment 1 together.

FIG. 9 is a plan view showing the first electrode and the second electrode of the liquid crystal display device of embodiment 1 together. Note that the enlarged view shown in FIG. 2 corresponds to an area b shown enclosed in a circle in FIG. 9. As shown, the first electrode 13, the second electrode 14 the lead wirings 23 and 24 are all provided on the same surface of the first substrate 11. Further, the respective external extraction electrode terminals 25 and 26 and the jumper wiring 27 and each of the connection wirings 28 are all provided to the terminal part 11a of the upper edge part, on the same surface of the first substrate 11. Then, the above described insulating film 29 is provided to this terminal part 11a, and the jumper wiring 27 and the like is covered by this insulating film 29. Each of the external extraction electrode terminals 25 and 26 is exposed via each of the openings 29a of the insulating film 29.

Embodiment 2

The liquid crystal display device of embodiment 2 comprises a similar configuration as the liquid crystal display device of the above described embodiment 1 (refer to FIG. 1, etc.). Accordingly, when the liquid crystal display device of embodiment 2 is described below, the same names and reference numerals are used for the components common to the liquid crystal display device of embodiment 1, and the detailed descriptions thereof are suitably omitted. The main difference between embodiment 1 and embodiment 2 is the configuration of each of the external extraction electrode terminals 25 and the like on the upper edge part of the first substrate 11. The following describes embodiment 2 while mainly focusing on the differences.

Figure 10:
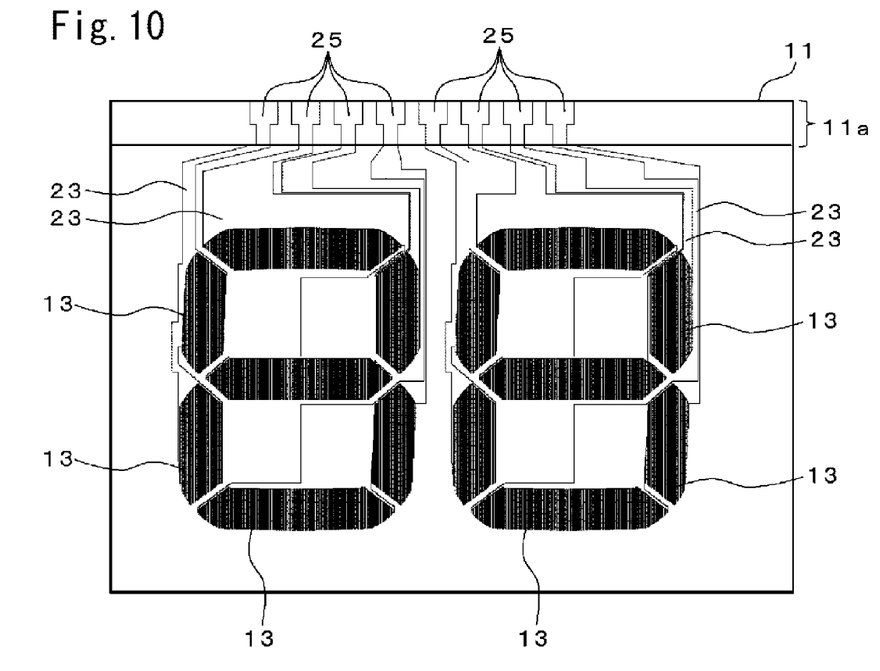
FIG. 10 is a plan view showing a configuration example of the first electrode (segment electrode) and lead wirings of the liquid crystal display device of embodiment 2.

FIG. 10 is a plan view showing a configuration example of the first electrode (segment electrode) and lead wirings of the liquid crystal display device of embodiment 2. As shown in FIG. 10, each of the first electrodes 13 is respectively and correspondingly provided to a total of 14 display parts for displaying the two-digit number. And corresponding to each of the first electrodes 13, lead wirings 23 are provided on the surface of the first substrate 11.

The differences from embodiment 1 are the shape and disposed state of each of the external extraction electrode terminals 25 provided to the terminal part 11a of the first substrate 11. Specifically, each of the external extraction electrode terminals 25 comprises an area formed with a relatively wide width and an area formed with a relatively narrow width, and is disposed with the area with the wide width near the upper edge side of the first substrate 11. With this arrangement, the gaps between each of the external extraction electrode terminals 25 can be more widely maintained on the side away from the upper edge of the first substrate 11.

Figure 11:
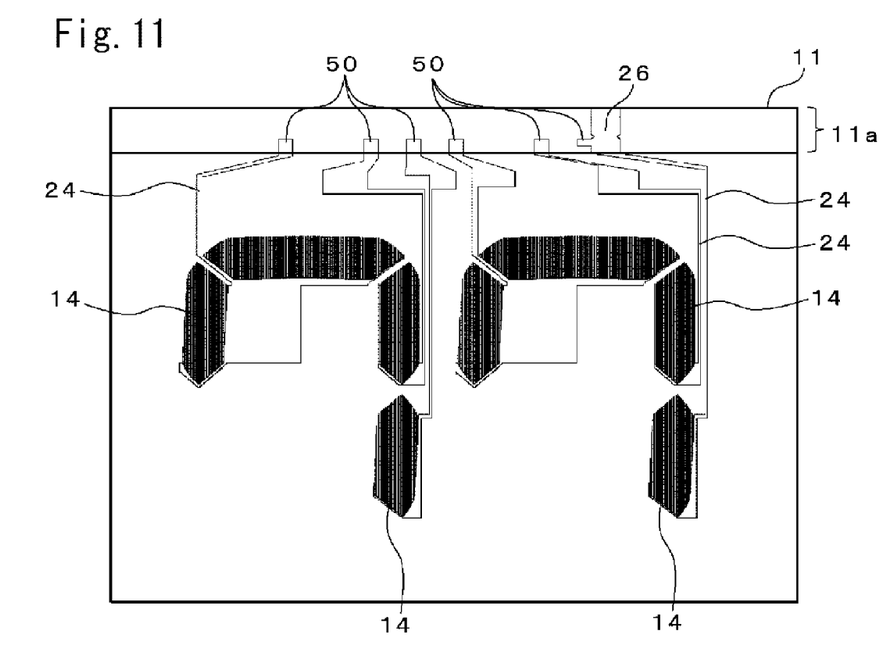
FIG. 11 is a plan view showing a configuration example of the second electrode (common electrode) and lead wirings of the liquid crystal display device of embodiment 2.
Figure 12:
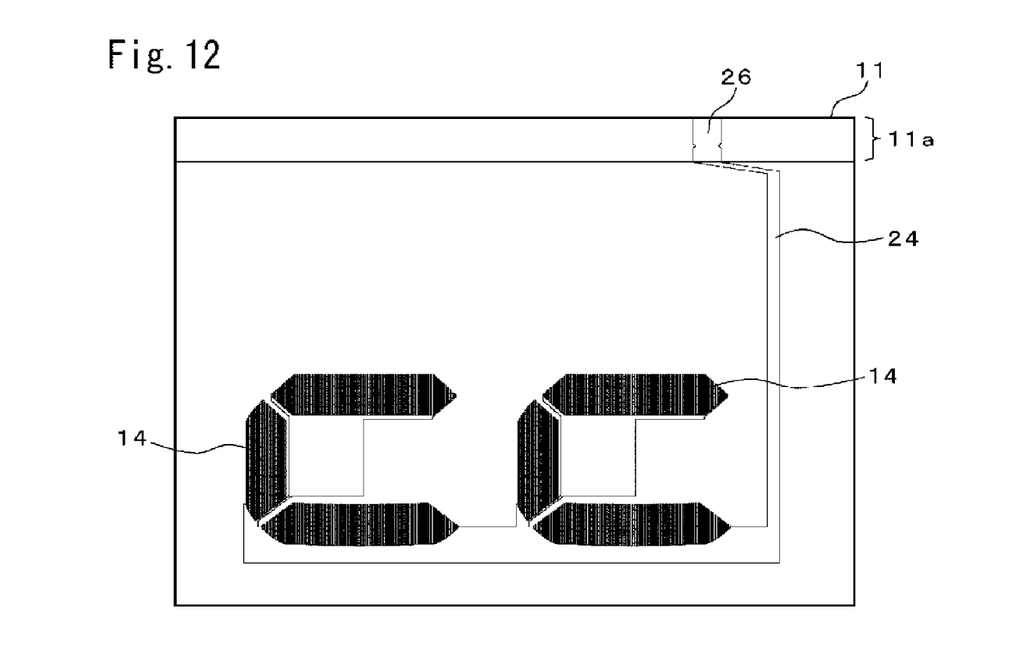
FIG. 12 is a plan view showing a configuration example of the second electrode (common electrode) and lead wirings of the liquid crystal display device of embodiment 2.

FIG. 11 and FIG. 12 are each a plan view showing a configuration example of the second electrode (common electrode) and lead wirings of the liquid crystal display device of embodiment 2. Each of the second electrodes 14 is respectively and correspondingly provided to a total of 14 display parts for displaying the two-digit number. FIG. 11 shows a portion of each of the second electrodes 14 corresponding to the above described wiring C1. FIG. 12 shows a portion of each of the second electrodes 14 corresponding to the above described wiring C2. And corresponding to each of the second electrodes 14, lead wirings 24 are representatively provided on the surface of the first substrate 11.

As shown in FIG. 11, a plurality of pad parts 50 respectively corresponding to each of the lead wirings 24 is provided to the terminal part 11a on the upper edge side of the first substrate 11 to connect each of the lead wirings 24 to each other from the outside. In the example shown, each of the pad parts 50 is disposed on the side away from the upper edge of the first substrate 11, on the terminal part 11a of the first electrode 11. Then, each of the pad parts 50 is disposed in the gap between the external extraction electrode terminals 25 so as to not contact the external extraction electrode terminal 25, on the terminal part 11a. Each of the pad parts 50 is alternately disposed between the areas with a relatively narrow width of each of the above described external extraction electrode terminals 25 (refer to FIG. 14 described later). The respective lead wirings 24 are all connected to one external extraction terminal 26 by connecting the areas between these pad parts 50 using some kind of conduction material (a conductive paste, for example). The external extraction electrode terminal 26 is a terminal for connection to an external driving circuit which is not shown. The lead wirings 24 shown in FIG. 12 are directly connected to the external extraction electrode terminal 26.

Figure 13:
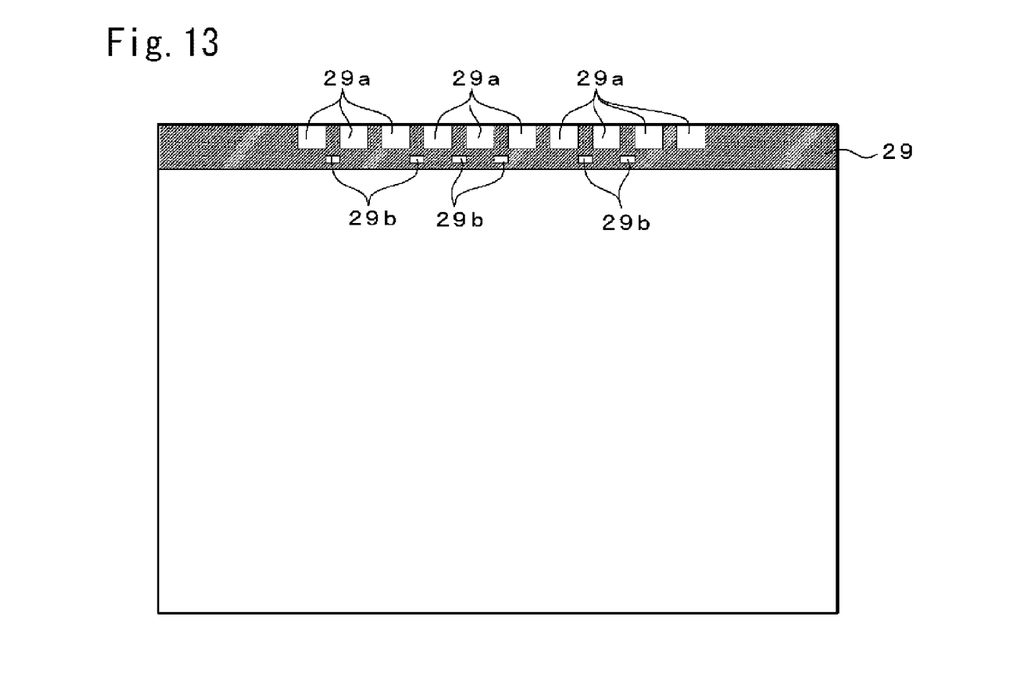

FIG. 13 is a plan view showing a disposition example of the insulating film provided to the upper side of the pad part and the like. Each of the external extraction electrode terminals 25 and 26 is disposed on the same surface of the terminal part 11a on the upper edge side of the first substrate 11, and a lead frame and the like (not shown) are provided to each of the external extraction electrode terminals 25 and the like, making it necessary to prevent short circuiting between each of the pad parts 50 and the external extraction electrode terminal 25. For this reason, as shown, the insulating film 29 comprising the plurality of openings 29a, each exposing an area where each of the external extraction electrode terminals 25 and 26 is formed, and a plurality of openings 29b, each exposing an area where each of the pad parts 50 is formed, are provided to the terminal part 11a of the first substrate 11. The insulating film 29 here is, for example, an $SiO_2$ film or the like. By providing such the insulating film 29, it is possible to reliably prevent short circuiting between each of the pad parts 50 and the external extraction electrode terminals 25.

Figure 14:
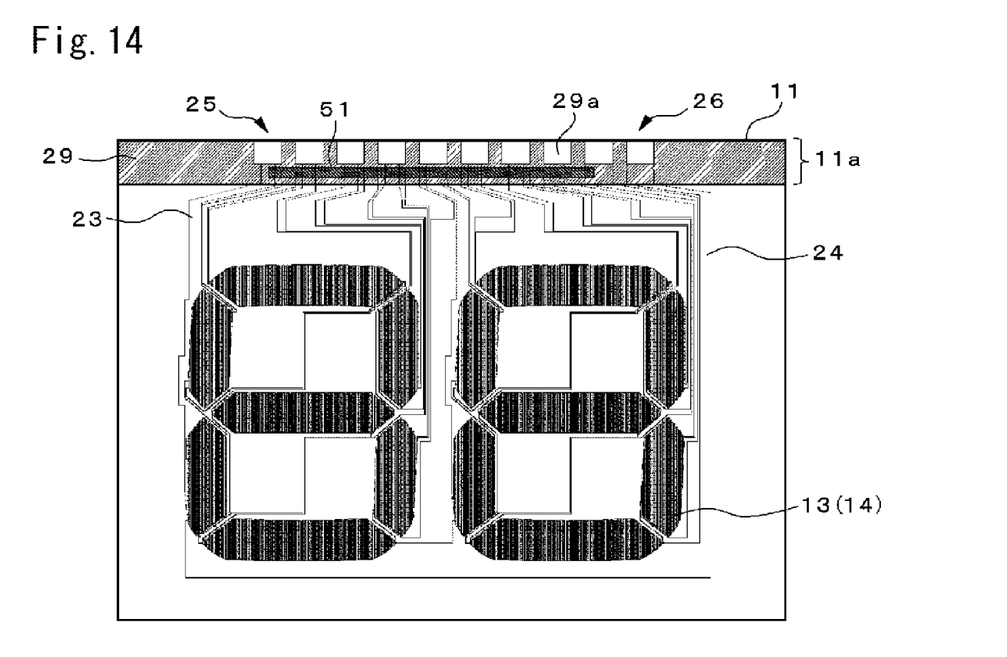
FIG. 14 is a plan view showing the first electrode and the second electrode of the liquid crystal display device of embodiment 2 together.

FIG. 14 is a plan view showing the first electrode and the second electrode of the liquid crystal display device of embodiment 2 together. As shown, the first electrode 13, the second electrode 14 the lead wirings 23 and 24 are all provided on the same surface of the first substrate 11. Further, the respective external extraction electrode terminals 25 and 26 and the respective pad parts 50 are all provided to the terminal part 11a of the upper edge part, on the same surface of the first substrate 11. Then, the above described insulating film 29 is provided to this terminal part 11a, and each of the pad parts 50 is covered by this insulating film 29. Each of the external extraction electrode terminals 25 and 26 is exposed via each of the openings 29a of the insulating film 29, and each of the pad parts 50 is exposed via each of the openings 29b of the insulating film 29. The area between each of the pad parts 50 is alternately connected by the conduction material 51 provided on the insulating film 29, and connected to one external extraction electrode terminal 26. The conduction material 51 here is, for example, a conductive paste.

Note that a conduction rubber contact may also be used as the conduction material 51 for connecting each of the pad parts 50. Further, in a case where at least one side of a seal member used for bonding the first substrate 11 and the second substrate 12 is a material capable of conduction in the in-plane direction parallel to the substrate (for example, in a case where the seal material includes a conductive material such as carbon), it is possible to dispose each of the openings 29b of the insulating film 29 below the seal material. Further, it is also possible to utilize a structure wherein each of the openings 29b is provided so as to be superimposed on a section where the first substrate 11 and the second substrate 12 overlap, on the outside of the seal material as well, and the conduction section is protected from the external atmosphere. Furthermore, a clip terminal may also be used as the conduction material 51. An example of such a clip terminal is disclosed in Japanese Unexamined Patent Application Publication No. 2003-45516.

Embodiment 3

The liquid crystal display device of embodiment 3 comprises a similar configuration as the liquid crystal display devices of the above described embodiment 1 and embodiment 2 (refer to FIG. 1, etc.). Accordingly, when the liquid crystal display device of embodiment 3 is described below, the same names and reference numerals are used for the components common to the liquid crystal display devices of embodiment 1 and embodiment 2, and the detailed descriptions thereof are suitably omitted. The liquid crystal display device of embodiment 3 comprises both of the configurations respectively shown in the above described embodiment 1 and embodiment 2 in order to achieve a multiplex drive under ⅓ duty.

Figure 15:
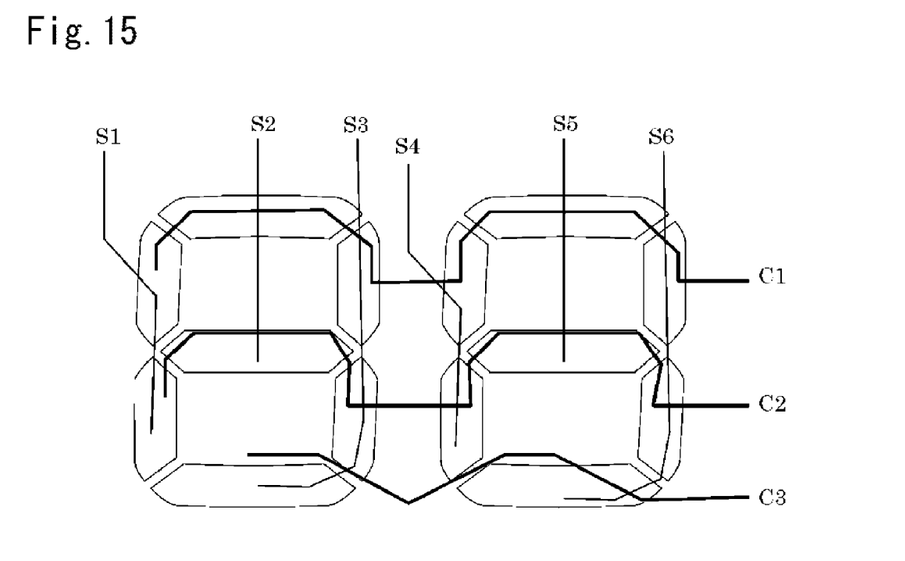
FIG. 15 is a diagram for explaining the connected state of the liquid crystal display device of embodiment 3.

FIG. 15 is a diagram for explaining the connected state of the liquid crystal display device of embodiment 3. Here, the connected state of a segment display-type liquid crystal display device that displays a two-digit number is shown. The number of each digit is respectively expressed using seven display parts (segment display parts), with 14 display parts existing in total. According to this embodiment, a case where each display part of such a segment display type is multiplex driven under ⅓ duty is considered. Six wirings S1-S6 indicated by a solid fine line show the connected state of each first electrode (segment electrode), and three wirings C1, C2, and C3 indicated by a solid bold line show the connected state of each second electrode (scanning electrode).

Figure 16:
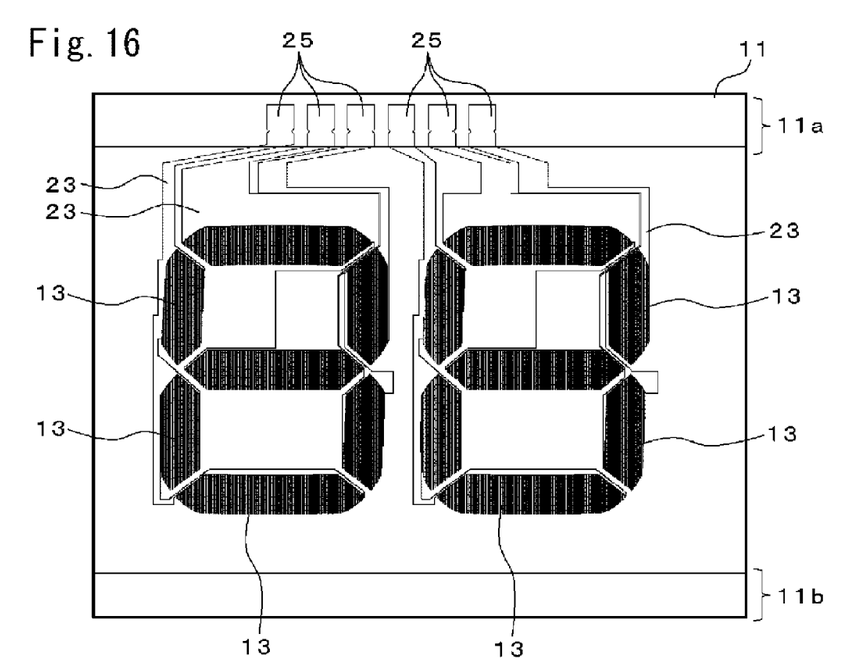
FIG. 16 is a plan view showing a configuration example of the first electrode (segment electrode) and lead wirings of the liquid crystal display device of embodiment 3.

FIG. 16 is a plan view showing a configuration example of the first electrode (segment electrode) and lead wirings of the liquid crystal display device of embodiment 3. As shown in FIG. 16, each of the first electrodes 13 is respectively and correspondingly provided to a total of 14 display parts for displaying the two-digit number. And corresponding to each of the first electrodes 13, lead wirings 23 are provided on the surface of the first substrate 11. While the structure of each of the external extraction electrode terminals 25 is the same as that of embodiment 1, in this embodiment, the number of external extraction electrode terminals 25 is reduced to six compared with the liquid crystal display device of embodiment 1. Further, in addition to the terminal part 11a on the upper edge side, a terminal part 11b is provided to the lower edge side of the first substrate 11 as well.

Figure 17:
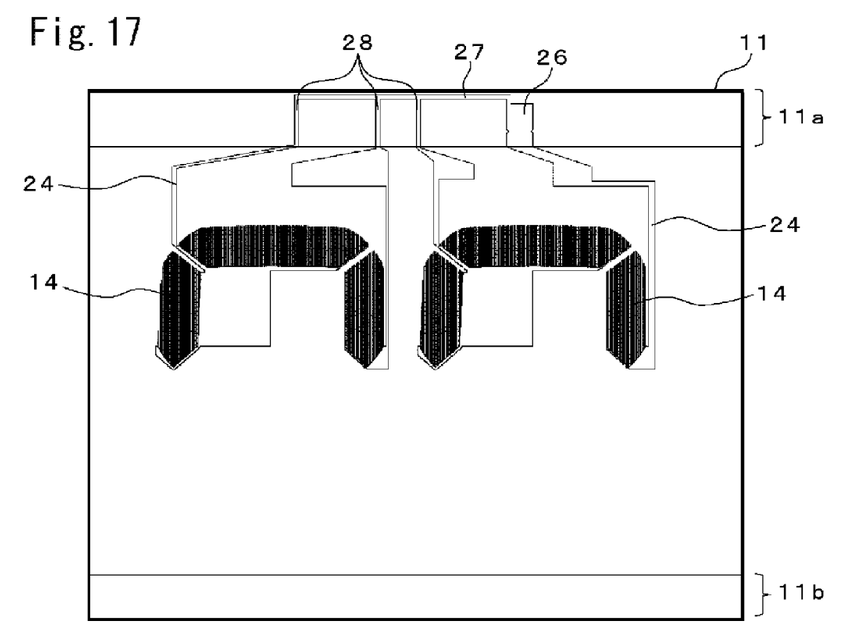
FIG. 17 is a plan view showing a configuration example of the second electrode (common electrode) and lead wirings of the liquid crystal display device of embodiment 3.
Figure 18:
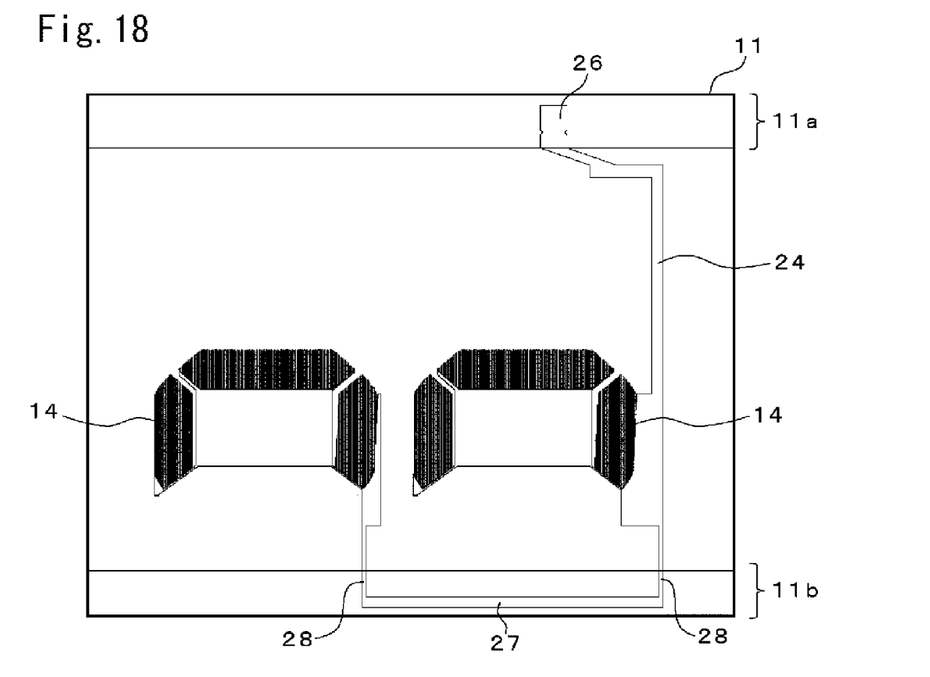
FIG. 18 is a plan view showing a configuration example of the second electrode (common electrode) and lead wirings of the liquid crystal display device of embodiment 3.
Figure 19:
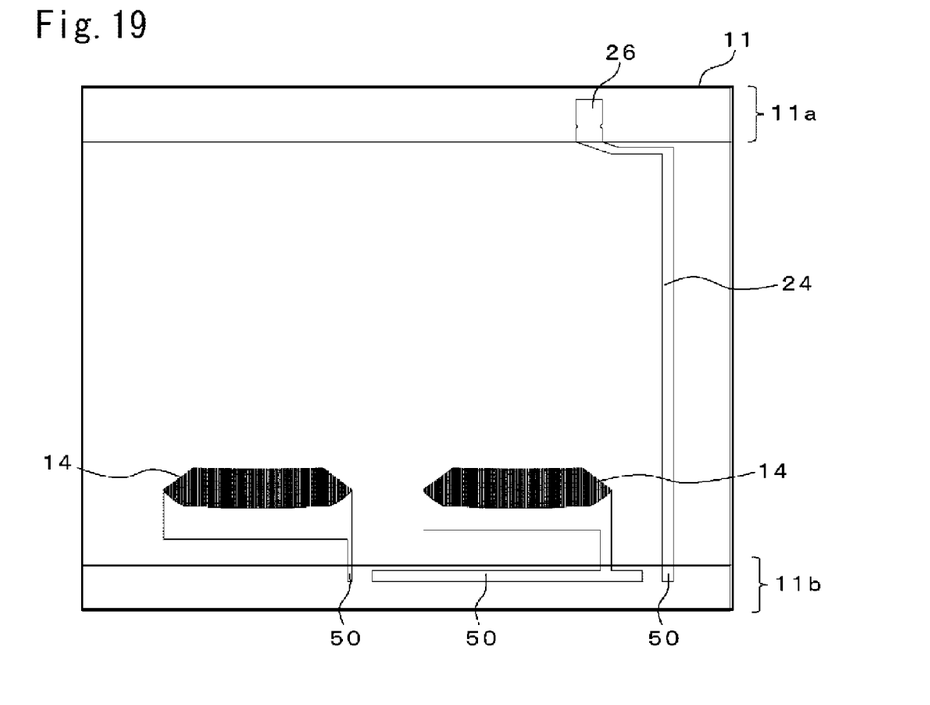
FIG. 19 is a plan view showing a configuration example of the second electrode (common electrode) and lead wirings of the liquid crystal display device of embodiment 3.

FIG. 17, FIG. 18 and FIG. 19 are each a plan view showing a configuration example of the second electrode (common electrode) and lead wirings of the liquid crystal display device of embodiment 3. Each of the second electrodes 14 is respectively and correspondingly provided to a total of 14 display parts for displaying the two-digit number. Each figure shows a portion of each of the second electrodes 14, and more specifically a section corresponding to one of the above described three wirings C1, C2, and C3. The lead wiring 24 is connected to each of the second electrodes 14.

As shown in FIG. 17, similar to the above described embodiment 1, a jumper wiring 27 for connecting each of the lead wirings 24 to each other is provided to the terminal part 11a on the upper edge side of the first substrate 1, and the end parts of each of the lead wirings 24 and the jumper wiring 27 are respectively connected by the connection wirings 28. Further, as shown in FIG. 18, similar to the above described embodiment 1, a jumper wiring 27 for connecting each of the lead wirings 24 to each other is provided to the terminal part 11b on the lower edge side of the first substrate 1, and the end parts of each of the lead wirings 24 and the jumper wiring 27 are respectively connected by the connection wirings 28. Further, as shown in FIG. 19, similar to the above described embodiment 2, a plurality of pad parts 50 respectively corresponding to each of the lead wirings 24 is provided to the terminal part 11b on the lower edge side of the first substrate 11 to connect each of the lead wirings 24 to each other from the outside.

Figure 20:
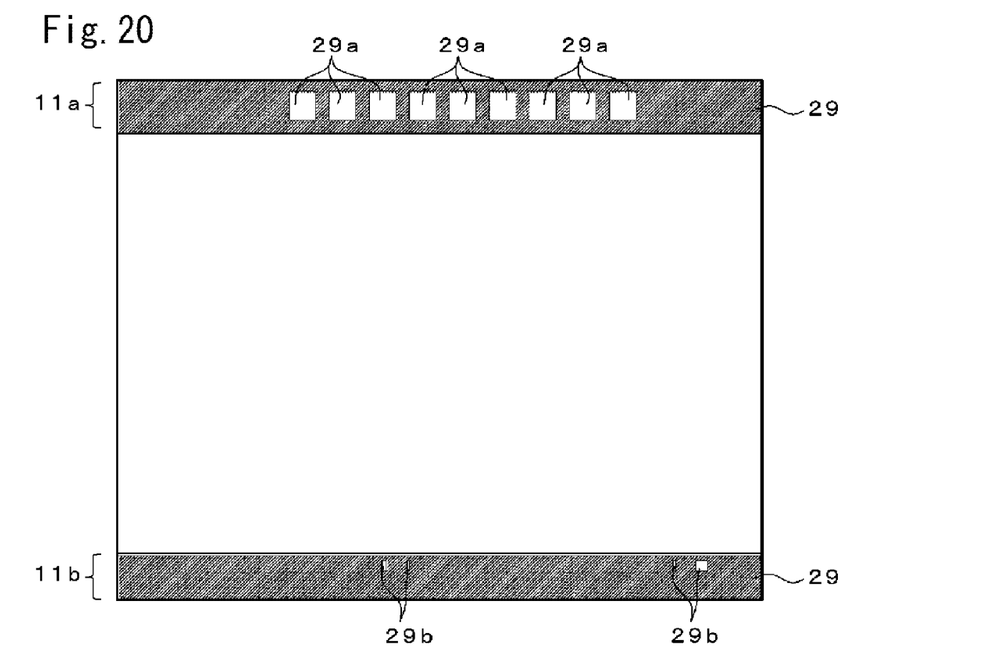

FIG. 20 is a plan view showing a disposition example of the insulating film provided to the upper side of the jumper wiring and pad parts and the like. Similar to the above described embodiment 1, an insulating film 29 provided to the terminal part 11a comprises a plurality of openings 29a, each exposing an area where each of the external extraction electrode terminals 25 is formed. Similar to the above described embodiment 2, an insulating film 29 provided to the terminal part 11b comprises a plurality of openings 29b, each exposing an area where each of the pad parts 50 is formed.

Figure 21:
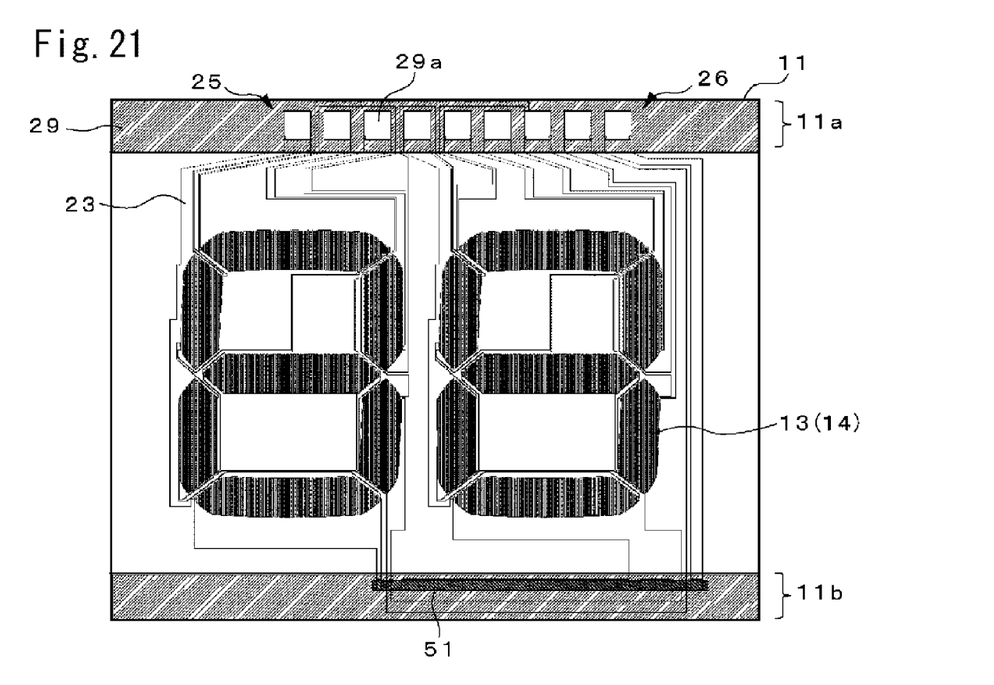
FIG. 21 is a plan view showing the first electrode and the second electrode of the liquid crystal display device of embodiment 3 together.

FIG. 21 is a plan view showing the first electrode and the second electrode of the liquid crystal display device of embodiment 3 together. The jumper wiring 27 and the like is covered by this insulating film 29, and each of the external extraction electrode terminals 25 and 26 is exposed via each of the openings 29a of the insulating film 29. Further, each of the pad parts 50 is exposed via each of the openings 29b of the insulating film 29. The area between each of the pad parts 50 is alternately connected by the conduction material 51 provided on the insulating film 29, and connected to one external extraction electrode terminal 26.

According to the liquid crystal display device of each embodiment such as described above, several of the lead wirings 23 provided to the first substrate 11 side are configured to be connected to each other via the detour wiring provided to the second substrate 12 side, thereby making it possible to increase the freedom of the wiring layout on the substrate. With this arrangement, it is easy to dispose each electrode and lead wiring on the same surface without providing a crossing section, making it possible to achieve a multiplex-driven IPS mode liquid crystal display device suitable for a segment display type.

Note that this invention is not limited to the subject matter of the foregoing embodiments, and can be implemented by being variously modified within the scope of the gist of the present invention. For example, while a case where the liquid crystal layer has a uniaxial planer alignment when voltage is not applied has been described in the above described embodiments, the orientation of the liquid crystal layer is not particularly limited thereto.

What is claimed is:

1. A liquid crystal display device comprising a display part for displaying standard characters or designs, further comprising:
   a first substrate and a second substrate that are disposed facing each other;
   a liquid crystal layer disposed between the first substrate and the second substrate;
   a plurality of first electrodes provided to one surface side of the first substrate;
   a plurality of second electrodes provided to one surface side of the first substrate;
   a plurality of first lead wirings provided to one surface side of the first substrate, each connected to one of the plurality of first electrodes;
   a plurality of second lead wirings provided to one surface side of the first substrate, each connected to one of the plurality of second electrodes;
   a terminal part exposed on one edge of the first substrate without overlapping the second substrate;
   a plurality of first external extraction electrode terminals, each connected to any one of the plurality of first lead wirings, provided to the terminal part;
   a detour wiring that connects several second lead wirings of the plurality of second lead wirings to each other, with each of the plurality of first external extraction electrode terminals electrically insulated, provided to the terminal part; and
   a plurality of second external extraction electrode terminals, each connected to the second lead wirings connected to the detour wirings or the second lead wirings not connected to the detour wirings of the plurality of second lead wirings, provided to the terminal part.

2. The liquid crystal display device according to claim 1, wherein:
   the detour wiring includes one or more connection wirings and a jumper wiring,
   the connection wirings are disposed in gaps between the plurality of first external extraction electrode terminals in the planar view, and
   the jumper wiring is disposed on the side closer to an edge of the first substrate than each of the plurality of first external extraction electrode terminals in the planar view.

3. The liquid crystal display device according to claim 2, wherein:
   the plurality of first electrodes and the plurality of second electrodes each comprise a plurality of electrode branches,
   each of the plurality of first electrodes forms a pair with any one of the plurality of second electrodes, and
   the first electrode and the second electrode that form the pair are disposed so that the plurality of electrode branches of each is alternately arranged.

4. The liquid crystal display device according to claim 1, wherein:
   the detour wirings include one or more pad parts and a conduction material, further comprising:
   an insulating film provided to the terminal part comprising one or more openings that expose at least a part of the pad parts,
   the pad parts are disposed in a gap between the plurality of first external extraction electrode terminals in the planar view, and the conduction material is provided to an upper side of the insulating film contacting the pad part.

5. The liquid crystal display device according to claim 4, wherein:
   the conduction material is a conductive paste.

6. The liquid crystal display device according to claim 5, wherein:
   the plurality of first electrodes and the plurality of second electrodes each comprise a plurality of electrode branches,
   each of the plurality of first electrodes forms a pair with any one of the plurality of second electrodes, and
   the first electrode and the second electrode that form the pair are disposed so that the plurality of electrode branches of each is alternately arranged.

7. The liquid crystal display device according to claim 4, wherein:
   the plurality of first electrodes and the plurality of second electrodes each comprise a plurality of electrode branches,
   each of the plurality of first electrodes forms a pair with any one of the plurality of second electrodes, and
   the first electrode and the second electrode that form the pair are disposed so that the plurality of electrode branches of each is alternately arranged.

8. The liquid crystal display device according to claim 1, wherein:
   the plurality of first electrodes and the plurality of second electrodes each comprise a plurality of electrode branches,
   each of the plurality of first electrodes forms a pair with any one of the plurality of second electrodes, and
   the first electrode and the second electrode that form the pair are disposed so that the plurality of electrode branches of each is alternately arranged.

* * * * *